United States Patent Office 3,307,429
Patented Mar. 7, 1967

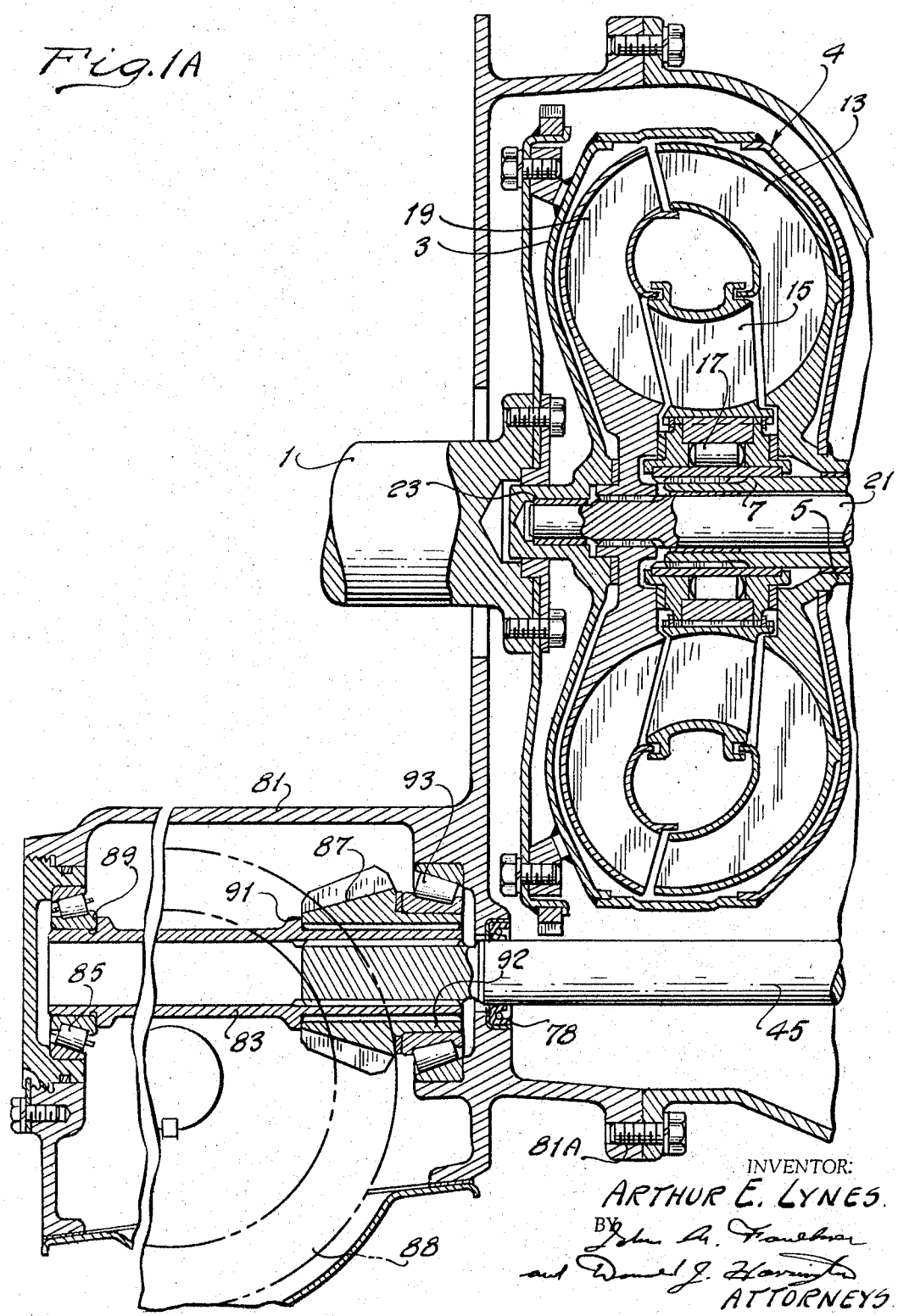

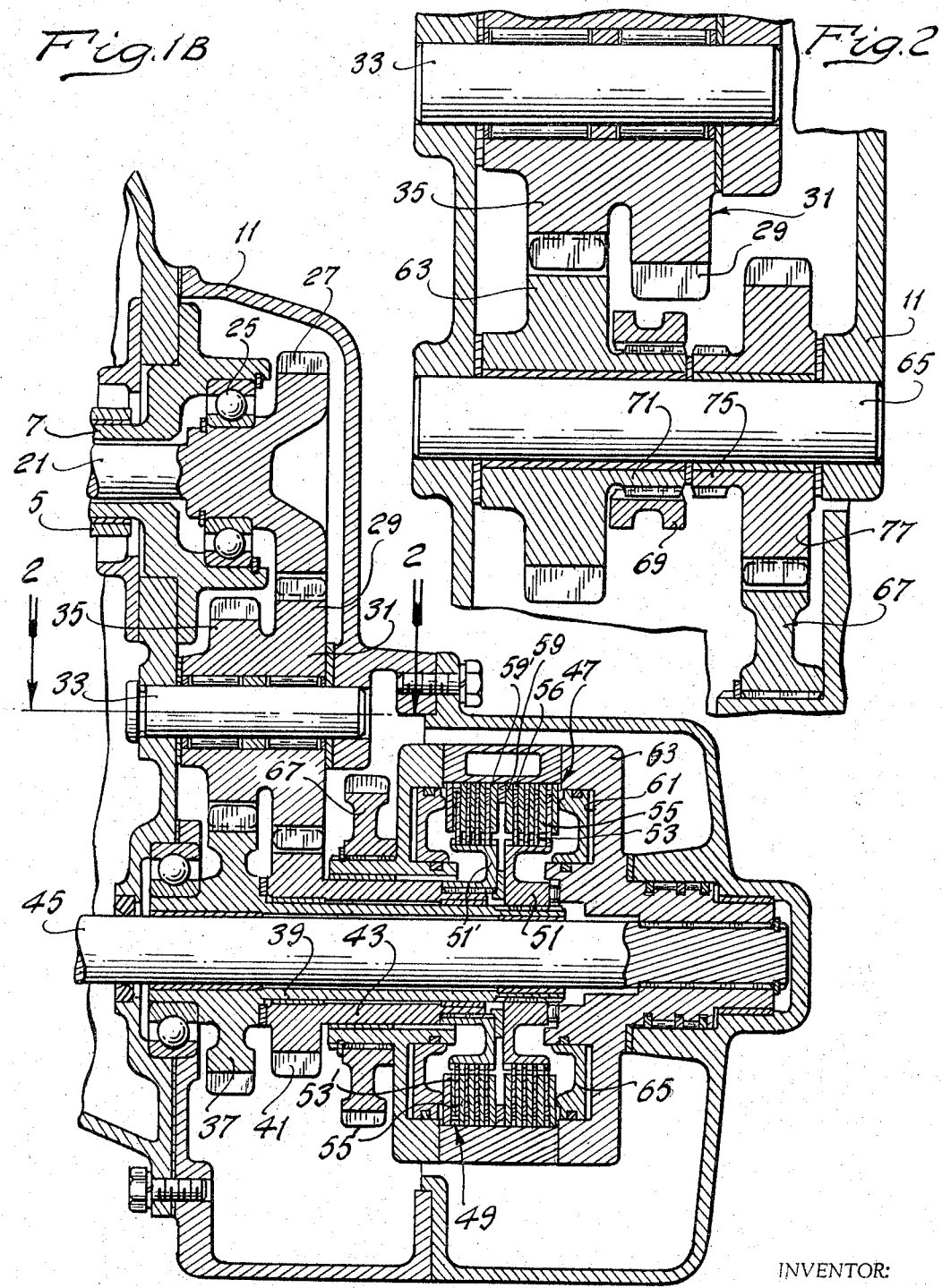

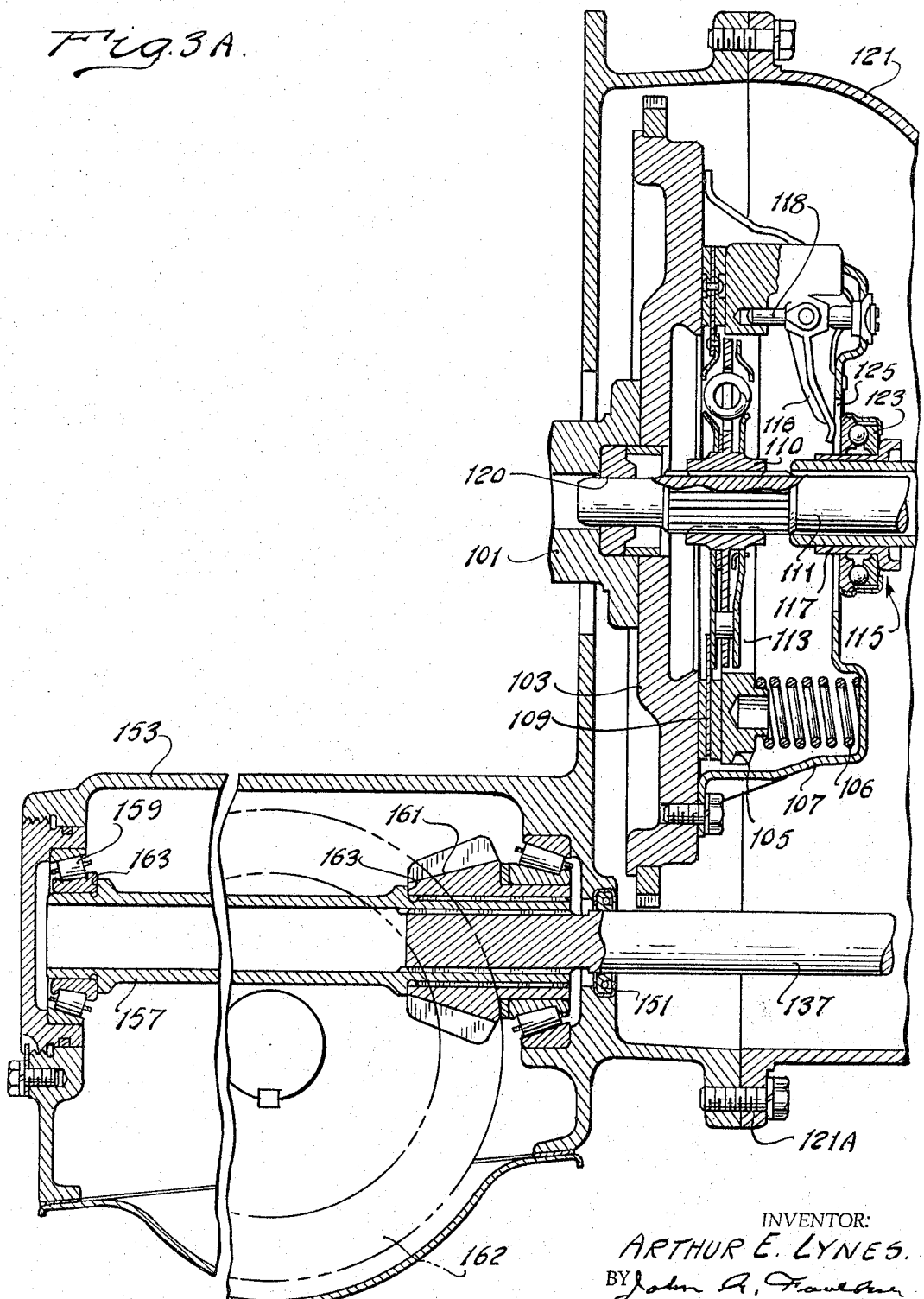

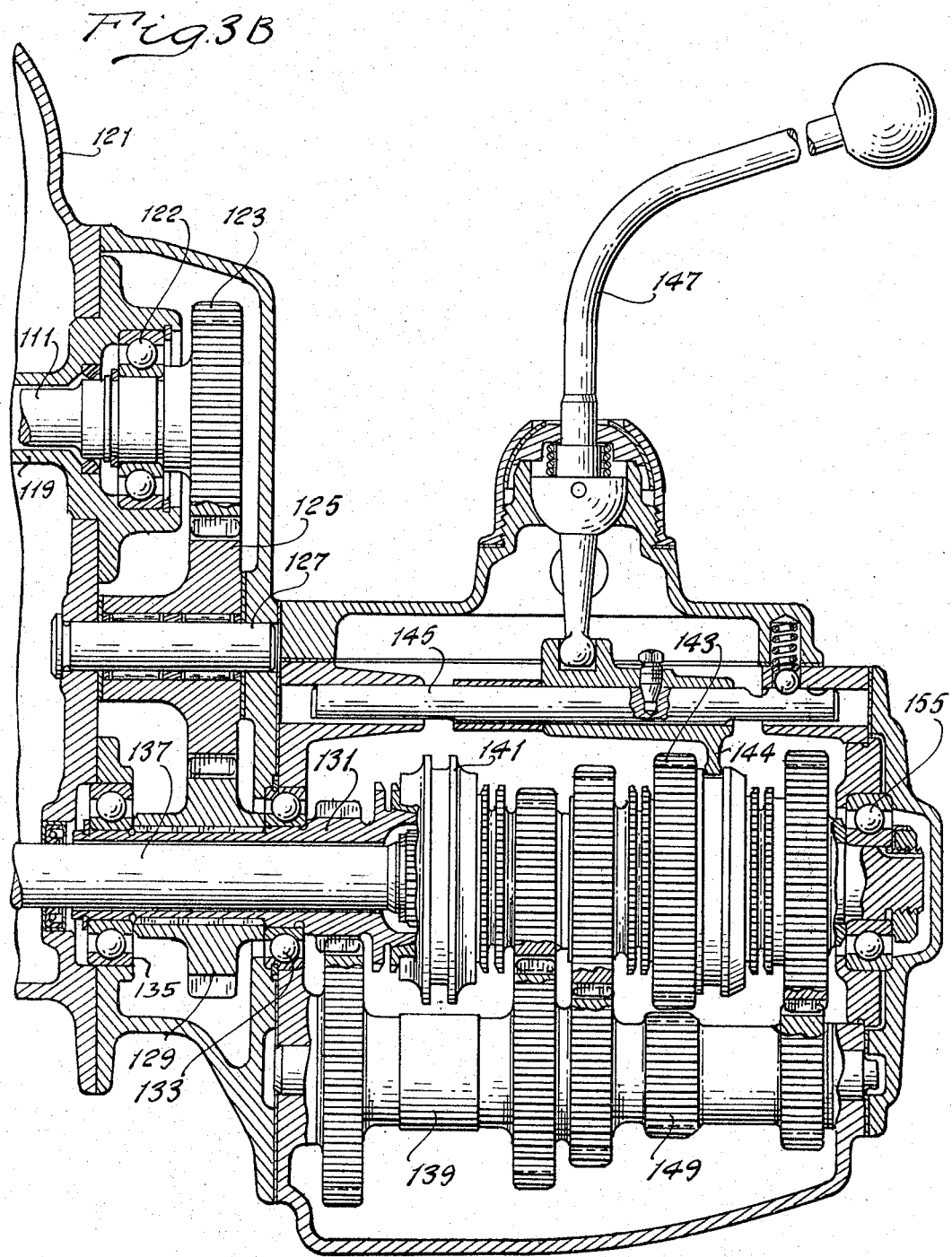

3,307,429
MOTOR VEHICLE TRANSMISSION-DRIVELINE UNITS
Arthur E. Lynes, Kenilworth, England, assignor to Ford Motor Company, Dearborn, Mich., a corporation of Delaware
Filed July 6, 1964, Ser. No. 380,544
Claims priority, application Great Britain, Aug. 9, 1963, 31,461/63
2 Claims. (Cl. 74—731)

This invention relates generally to transaxle driveline arrangements for engine powered wheeled vehicles, and more particularly to a compact driveline arrangement for automotive vehicles that comprises an internal combustion engine, a differential gear mechanism located directly below the engine and power output shafts that rotate about an axis that is transverse to the engine crankshaft axis. Such arrangements are adapted particularly for use either in vehicles having a rearwardly mounted engine and rear traction wheels or in vehicles having a forwardly mounted engine with forward traction wheels.

According to a principal feature of this invention, a coupling, which is rotatably mounted on the crankshaft axis, is drivably connected through gearing to a countershaft extending directly below the coupling, the countershaft being situated in parallel disposition with respect to the axis of the engine crankshaft. The torque transmitting gearing is located rearwardly of the coupling and the differential mechanism is disposed forwardly of the coupling.

The provision of a transaxle arrangement of the type above set forth being an object of this invention, it is another object of the invention to provide an arrangement in which the torque transmitting elements are strategically positioned to accommodate either a selectively engageable friction coupling and driver controlled multiple speed ratio gearing or a hydrokinetic coupling such as a fluid torque converter and semi-automatic gearing. It is contemplated that modifications to the body and chassis structure of the vehicle will not be required when one coupling and gearing system is substituted for the other.

It is a further object of this invention to provide a vehicle driveline arrangement of the type above set forth wherein provision is made for employing conventional driver controlled, multiple speed ratio gearing or semi-automatic multiple speed ratio gearing, as desired, while enjoying the advantages of interchangeability of common components.

In the arrangement that includes a semi-automatic transmission, the coupling preferably is in the form of a high performance hydrokinetic torque converter having a maximum stall torque ratio of approximately 3:1. The gearing used with the torque converter is adapted to provide selectively a connection having either a direct-drive ratio or a reduction gear ratio between the coupling and the differential mechanims. In the arrangement that includes a hydrokinetic torque converter, the gearing is in the form of a cluster gear assembly having one element thereof in continuous meshing engagement with a driven gear that is aligned with the axis of the engine crankshaft. Another element of the cluster gear assembly continuously meshes with power output gears coaxially arranged with respect to the countershaft, and selectively engageable friction clutches are provided for connecting the power output gears to the countershaft. One of the gear elements of the cluster gear assembly may be arranged in continuous meshing engagement with the reverse idler gears. The latter may be connected to one of power output gears to establish a reverse drive torque delivery path.

If the alternate arrangement with a friction clutch is employed, the gearing is in the form of a multiple speed ratio synchronized transmission system that receives torque from torque transfer gearing that delivers the torque of the engine crankshaft to the power input element of multiple ratio gearing, the axis of the power input element being common to the axis of the countershaft. The provision of such an alternate arrangement is another object of this invention.

For the purpose of describing the invention more particularly, reference will be made to the accompanying drawings wherein:

FIGURES 1A and 1B show an axial cross sectional view of a first driveline arrangement;

FIGURE 2 is a partial cross sectional view showing reverse gearing that may be employed with the system of FIGURE 1; and FIGURES 3A and 3B show an axial cross sectional view of an alternate driveline arrangement.

The transmission driveline shown in FIGURES 1A and 1B includes a hydrokinetic torque converter and a two-speed change-speed gear system, while the driveline shown in FIGURES 3A and 3B includes a conventional friction clutch and a conventional gearbox.

The end of a crankshaft 1 in the unit shown in FIGURES 1A and 1B is bolted to the housing 3 of a torque converter 4. The right hand end of the housing 3 is fixed to a cylindrical member 5 which is rotatably mounted on a cylindrical sleeve extension 7 fixed to the casing 11 of the unit.

The impeller 13 of the converter is fixed to the housing 3, the stator 15 is connected by a conventional one-way clutch 17 to the extension 7 and the turbine 19 is splined to the converter output shaft 21, the latter being rotatably supported by a journal bearing in a counterbore 23 in the crankshaft and also by a ball bearing 25. The right hand end of the shaft 21 is formed as a gear 27.

The gear 27 meshes with a gear 29 of a transfer gear cluster 31 rotatably mounted on a shaft 33 which is fixed in the casing 11. The gear 35 of the cluster meshes with a gear 37 at the end of a sleeve shaft 39, while the gear 29 meshes with a gear 41 at the end of a sleeve shaft 43. The sleeve shafts 39 and 43 are coaxial with the output shaft 45 of the change-speed gearing which comprises the transfer gear cluster 31 and gears 37 and 41. These gears are adapted to be connected respectively to output shaft 45 by friction clutches 47 and 49.

The clutch 47 comprises a hub 51 splined to the sleeve shaft 39, friction discs 53 which are splined to the hub 51 and interleaved with plates 55 splined to the inner cylindrical surface of a clutch housing 63, a reaction plate 59 fixed to the surface 57, an annular cylinder 61 formed in the clutch housing 63 and an annular piston 65 slidable in the cylinder 61. When fluid under pressure is admitted to the cylinder 61, the discs 53 and plates 55 are forced towards the reaction plate 59 to connect the hub 51 to the housing 63. The clutch 49 is identical with the clutch 47 and the same reference numerals are used for corresponding parts, although prime notations have been added. The right hand end of the clutch housing 63 is splined to the shaft 45.

A fluid pressure control system (not shown) is operable either to admit fluid under pressure to the clutch 47 and exhaust the clutch 49 to establish a reduction gear ratio between the shafts 21 and 45, or to admit fluid under pressure to the clutch 49 and exhaust the clutch 47 to establish a 1:1 gear ratio between the shafts 21 and 45. It also may exhaust both clutches to condition the transmission for neutral.

A reverse idler gear 63 (FIGURE 2) is rotatably mounted on a shaft 65 fixed to the casing 11. It is in constant mesh with the gear 35 of the gear cluster 31. The gear 63 is connectible to a gear 77 splined to the shaft 65 by means of a splined sleeve 69 slidable from the position shown along splines on the hub 71 of the gear 63 to the right hand position in which it engages both the splines of the hub 71 and the splines of the hub 75 of the gear 77, the latter being in constant mesh with the gear 67.

The output shaft 45 extends beneath the torque converter 4 through an oil seal 78 into a differential casing 81 having a rearwardly disposed peripheral flange 81A to which a forwardly disposed flange of casing 11 is bolted.

A sleeve 83 is supported at its left hand end in the differential casing 81, which may form a part of the engine housing 1, by a tapered roller bearing 85, and its right hand end is splined to the shaft 45. A differential pinion 87 is splined to the right hand end of the sleeve 83 and meshes with the ring gear 88 of the differential. Shoulders 89 and 91 on the sleeve 83 engage the inner race of the bearing 85 and the pinion 87, respectively. The hub 92 of the pinion 87 is supported by a tapered roller bearing 93. The right hand end of the shaft 45 is supported by the clutch housing 63 which is journalled in the casing 11.

When the unit described above is assembled to an engine, the differential is located beneath the engine and the torque converter and change-speed gearing are located at the rear of the engine. The unit described above is interchangeable with the unit described below with reference to FIGURE 3.

In the transmission driveline unit shown in FIGURE 3 the right hand end of the crankshaft 101 is attached to the flywheel 103 forming part of a conventional frictional clutch 105.

The clutch 105 comprises a casing 107 bolted to the flywheel 103, a friction disc 109 mounted in the conventional manner on a hub 110 splined to a clutch output shaft 111, a pressure plate 113, coil springs 106 compressed between the casing 107 and pressure plate 113, levers 116 pivotably mounted in studs 118 fixed in the casing 107 with one end thereof in engagement with the pressure plate 113 and a release mechanism 115. The mechanism 115 comprises a hub 117 slidable along a cylindrical member 119 fixed to a main casing 121, and a ball bearing 123. The left hand race of the bearing 123 engages the other end of the levers 116 so that when the hub 117 is moved to the left by a fork (not shown), the levers pivot to move the pressure plate 113 away from the friction disc 100 against the force of springs 106 to disengage the clutch.

The clutch output shaft 111, which is rotatably supported at one end in a counterbore 120 in the crankshaft 101 and at the other end by a ball bearing 122, has a gear 123 formed at the latter end. The gear 123 meshes with a transfer gear 125 rotatably mounted on a shaft 127 mounted in the casing 121. Gear 123 is itself in mesh with a gear 129 splined to a hollow transmission input shaft 131 which is rotatably mounted in ball bearings 133 and 135.

The transmission, which is a conventional synchromesh gearbox, comprises an output shaft 137, a layshaft 139, a slidable synchromesh hub 141 movable to the left to engage direct drive and to the right to engage 3rd gear, another slidable synchromesh hub 143 slidable to the left to engage 2nd gear and to the right to engage first gear, shifting forks of which only the 1st and 2nd gear fork 144 is shown and which are slidable along with rails 145 (only the rail for the fork 144 is shown), a universally mounted gear selector lever 147 and a reverse idler gear (not shown) slidable into mesh with the gear 149 on the layshaft and with the gear teeth on the hub 143.

The transmission output shaft 137 extends forwardly to the left through the input shaft 131, through an oil seal 151 into a differential casing 153 to which the main casing 121 is bolted. Like casing 81, casing 153 may form a part of the engine housing. The right hand end of the shaft 137 is supported by a ball bearing 155. A sleeve shaft 157 is mounted in tapered roller bearings 159 in the casing 153 and is splined to the end of the shaft 137. A differential pinion 161 is splined to the sleeve shaft 157 and meshes with a differential ring gear 162. The shaft 157 has shoulders 163 which abut the inner race of the bearing 159 and the pinion 161.

The casing 121 includes a flange 121A to facilitate a bolted connection with the differential casing 153.

It is contemplated that the differential mechanism and casing of one unit will be identical with that of the other unit. To modify one arrangement it merely is necessary to unbolt from the differential casing the casing that houses the coupling and gearing and then replace it with the corresponding casing for the other unit. No further modifications are required. The strategic arrangement of the coupling, the gearing and the countershaft for each unit makes this interchangeability possible.

What I claim is:

1. A power transmission driveline arrangement for an engine powered automotive vehicle for delivering power from an engine crankshaft to vehicle traction wheels, a differential gear mechanism situated directly below the vehicle engine and including housing portions that are common to said engine, a transmission housing releasably connected to said housing portions, a hydro-kinetic torque converter within said transmission housing including an impeller and a turbine situated in toroidal fluid flow relationship, a converter output shaft connected to said turbine, said impeller being connected directly to said crankshaft and adapted to rotate about an axis that is common to the axis of said crankshaft, a countershaft journaled in said transmission housing for rotation about an axis that is parallel to said crankshaft axis and which extends below said torque converter, one end of said countershaft being connected to power input portions of said differential mechanism, driven portions of said differential mechanism being adapted to be connected to said traction wheels and being adapted for rotation about an axis that is transverse to the axis of said crankshaft, gearing situated on one side of said torque converter remote from said engine, said gearing including a pair of driven gear elements rotatably journaled for rotation about the axis of said countershaft, a driving gear connected to the converter output shaft, a cluster gear assembly meshing with said driving gear and including separate portions meshing respectively with each of said driven gears, and selectively engageable clutch means for connecting each of said driven gears to the other end of said countershaft.

2. A power transmission driveline arrangement for an engine powered automotive vehicle for delivering power from an engine crankshaft to vehicle traction wheels, a differential gear mechanism situated directly below the vehicle engine and including housing portions that are common to said engine, a transmission housing releasably connected to said housing portions, a hydrokinetic torque converter within said transmission housing including an impeller and a turbine situated in toroidal fluid flow relationship, a converter output shaft connected to said turbine, said impeller being connected directly to said crankshaft and adapted to rotate about an axis that is common to the axis of said crankshaft, a countershaft journaled in said transmission housing for rotation about an axis that is parallel to said crankshaft axis and which extends below said torque converter, one end of said countershaft being connected to power input portions of said differential mechanism, driven portions of said differential mechanism being adapted to be connected to said traction wheels and being adapted for rotation about an axis that is transverse to the axis of said crankshaft, gearing situated on one side of said torque converter remote from said engine, said gearing including a pair of driven gear elements rotatably journaled for rotation about the axis of said countershaft, a driving gear connected to the converter output shaft, a cluster gear assembly meshing with said driving gear and including separate portions meshing respectively with each of said driven gears, selectively engageable clutch means for connecting each of said driven gears to the other end of said countershaft, a pair of reverse drive gears mounted for rotation within said transmission housing about an axis that is displaced from and parallel to the axes of said countershaft and said torque converter, one of said reverse gears being in meshing engagement with one gear element of said cluster gear assembly and the other of said reverse gears being in meshing engagement with one of said driven gears, and selectively engageable positive acting clutch means for connecting and disconnecting said reverse gears.

References Cited by the Examiner

UNITED STATES PATENTS

| | | | |
|---|---|---|---|
| 2,800,037 | 7/1957 | Czuba et al. | 74—730 |
| 2,844,973 | 7/1958 | Hill | 74—730 X |
| 3,115,048 | 12/1963 | Cape | 74—363 X |
| 3,184,984 | 5/1965 | Erdman et al. | 74—363 X |

FOREIGN PATENTS 1,292,688  3/1962  France.

DAVID J. WILLIAMOWSKY, *Primary Examiner.*

FRED C. MATTERN, JR., *Examiner.*

L. H. GERIN, *Assistant Examiner.*